United States Patent
Quake et al.

(10) Patent No.: US 7,042,649 B2
(45) Date of Patent: May 9, 2006

(54) MICROFABRICATED RUBBER MICROSCOPE USING SOFT SOLID IMMERSION LENSES

(75) Inventors: Stephen R. Quake, New York, NY (US); Yann Gambin, Paris (FR); Oliver Legrand, Paris (FR)

(73) Assignee: California Institute of Technology, Pasadena, CA (US)

( * ) Notice: Subject to any disclaimer, the term of this patent is extended or adjusted under 35 U.S.C. 154(b) by 71 days.

(21) Appl. No.: 10/915,943

(22) Filed: Aug. 10, 2004

(65) Prior Publication Data
US 2005/0052754 A1    Mar. 10, 2005

Related U.S. Application Data

(60) Provisional application No. 60/494,416, filed on Aug. 11, 2003.

(51) Int. Cl.
*G02B 21/02* (2006.01)
(52) U.S. Cl. .................. 359/661; 359/656; 359/721
(58) Field of Classification Search ............... 359/656, 359/661, 721
See application file for complete search history.

(56) References Cited

U.S. PATENT DOCUMENTS

| | | | |
|---|---|---|---|
| 4,155,862 A | 5/1979 | Mohn et al. | |
| 4,540,534 A | 9/1985 | Grendol | |
| 4,798,428 A | 1/1989 | Karim et al. | |
| 5,121,256 A | 6/1992 | Corle et al. | |
| 5,171,995 A | 12/1992 | Gast et al. | |
| 5,317,452 A | 5/1994 | Prentiss et al. | |
| 5,583,351 A | 12/1996 | Brown et al. | |
| 5,729,393 A | 3/1998 | Lee et al. | |
| 5,764,613 A | 6/1998 | Yamamoto et al. | |
| 5,776,191 A | 7/1998 | Mazzocco | |
| 5,815,306 A | 9/1998 | Sheridon et al. | |
| 5,939,709 A | 8/1999 | Ghislain et al. | |

(Continued)

FOREIGN PATENT DOCUMENTS

EP    0 362 993 A2    4/1990

(Continued)

OTHER PUBLICATIONS

Ashkin, A. et al., "Optical Trapping And Manipulation Of Single Cells Using Infrared Laser Beams," Nature, vol. 330, No. 24, pp. 769-771, Dec. 31, 1987.

(Continued)

Primary Examiner—Evelyn A. Lester
(74) Attorney, Agent, or Firm—Townsend and Townsend and Crew LLP

(57) ABSTRACT

Soft lithography with surface tension control is used to microfabricate extremely efficient solid immersion lenses (SILs) out of rubber elastomeric material for use in microscope type applications. In order to counteract the surface tension of the mold material in a negative mold that causes creep on a positive mold, material such as RTV is partially cured before use in order to allow the reticulation of polymer chains to change the viscosity of the uncured material in a controllable manner. In a specific embodiment, the techniques of soft lithography with surface tension control are used to make molded SILs out of the elastomer polydimethylsiloxane. The lenses achieve an NA in the range of 1.25. The principle of compound lens design is used to make the first compound solid immersion lens, which is corrected for higher light gathering ability and has a calculated NA=1.32. An important application of these lenses is integrated optics for microfluidic devices, specifically in a handheld rubber microscope for microfluidic flow cytometry.

3 Claims, 4 Drawing Sheets

U.S. PATENT DOCUMENTS

| | | |
|---|---|---|
| 6,181,478 B1 | 1/2001 | Mandella |
| 6,200,737 B1 | 3/2001 | Walt et al. |
| 6,236,513 B1 | 5/2001 | Mallary |
| 6,270,696 B1 | 8/2001 | Jain et al. |
| 6,277,545 B1 | 8/2001 | Iida et al. |
| 6,298,026 B1 | 10/2001 | Suzuki et al. |
| 6,301,055 B1 | 10/2001 | Legrand et al. |
| 6,307,689 B1 | 10/2001 | Ichimura et al. |
| 6,369,957 B1 | 4/2002 | Ishida |
| 6,441,359 B1* | 8/2002 | Cozier et al. ............ 250/216 |
| 6,503,831 B1 | 1/2003 | Speakman |
| 6,548,171 B1 | 4/2003 | Barbera-Guillem et al. |
| 6,560,030 B1 | 5/2003 | Legrand et al. |
| 6,608,726 B1 | 8/2003 | Legrand et al. |
| 6,614,598 B1 | 9/2003 | Quake et al. |
| 6,633,439 B1* | 10/2003 | Xu et al. ............ 359/719 |
| 6,713,389 B1 | 3/2004 | Speakman |
| 6,781,690 B1 | 8/2004 | Armstrong et al. |
| 6,795,254 B1* | 9/2004 | Hineno ............ 359/719 |
| 6,831,782 B1* | 12/2004 | Patton et al. ............ 359/396 |
| 6,836,384 B1 | 12/2004 | Legrand et al. |
| 6,841,096 B1* | 1/2005 | Quake et al. ............ 264/2.5 |
| 2003/0026173 A1* | 2/2003 | Verschuren ............ 369/13.06 |
| 2003/0032204 A1 | 2/2003 | Walt et al. |
| 2003/0076649 A1 | 4/2003 | Speakman |
| 2003/0231401 A1* | 12/2003 | Patton et al. ............ 359/619 |
| 2004/0085644 A1* | 5/2004 | Patton et al. ............ 359/626 |
| 2004/0196569 A1* | 10/2004 | Quake et al. ............ 359/656 |
| 2005/0036222 A1 | 2/2005 | Quake et al. |
| 2005/0168828 A1 | 8/2005 | Quake et al. |

FOREIGN PATENT DOCUMENTS

| | | |
|---|---|---|
| JP | 8-001810 A | 1/1996 |
| JP | 11-197587 A | 7/1999 |
| JP | 2000-89004 A | 3/2000 |
| WO | WO 98/19654 A1 | 5/1998 |

OTHER PUBLICATIONS

Ashkin, A. et al., "Optical-Trapping And Manipulation Of Viruses And Bacteria," Science, vol. 235, pp. 1517-1520, Mar. 20, 1987.

Buican, Tudor N. et al., "Automated Single-Cell Manipulation And Sorting By Light Trapping," Applied Optics, vol. 26, No. 24, pp. 5311-5316, Dec. 15, 1987.

Hornbeck, Larry J. et al., "Bistable Deformable Mirror Device," Spatial Light Modulators and Applications 1988 Technical Digest Series, Summaries of papers presented at the Spatial Light Modulators and Applications Topical Meeting, Optical Society of America, vol. 8, Postconference Edition, A215, pp. 107-110, Jun. 15-17, 1988.

Lessard, Guillaume A. et al., "A Scanning Apertureless Fluorescence Microscope," 8 pages, no date.

Lin, L. Y. et al., "Free-Space Micromachined Optical Switches For Optical Networking," IEEE Journal of Selected Topics in Quantum Electronics, vol. 5, No. 1, pp. 4-9, Jan. 1999.

Muller, Richard S. et al., "Surface-Micromachined Microoptical Elements And Systems," Proceedings of the IEEE, vol. 86, No. 8, pp. 1705-1720, Aug. 1998.

Yang, T. J. et al., "An Apertureless Near-Field Microscope For Fluorescence Imaging," Applied Physics Letters, vol. 76, No. 3, pp. 378-380, Jan. 17, 2000.

Berg, Howard C. "Dynamic properties of bacterial flagellar motors", Nature, vol. 248, May 3, 1974.

Berry, Richard M. et al. "Absence of a barrier to backwards rotation of the bacterial flagellar motor demonstrated with optical tweezers", Proc. Natl. Acad. Sci, USA. vol. 94, pp. 14433-14437, (Dec. 1997).

Brody et al. "A Self-Assembled Microlensing Rotational Probe" Applied Physics Letters, 1999, pp. 144-146, vol. 74, No. 1.

Elson, Elliot L. "Fluorescence Correlation Spectroscopy and Photobleaching Recovery", Ann. Rev. Phys. Chem. (1985);36:379-406.

Finer, Jeffrey T. et al. "Single myosin molecule mechanics: piconewton forces and nanometre steps." Nature, vol. 368, Mar. 10, 1994, pp. 113-119.

Jameson, D.M. and Hazlett, T.L. "Time-Resolved Fluorescence in Biology and Biochemistry", Biophysical and Biochemical Aspects of Fluorescence Spectroscopy; T.G. Dewey Ed., (1991), pp. 105-133, Plenum Publishing Corp.

Miguez, H. et al. "Photonic crystal properties of packed submicrometric $SiO_2$ spheres", American Institute of Physics (1997), 3 pages.

Kinosita, Kazuhiko Jr. et al. "$F_1$-ATPase: A rotary motor made of a single molecule", Cell, vol. 93, pp. 21-24, Apr. 3, 1998.

Mervis, J. et al. "Aligning and attaching a lens to a optical fiber using light pressure force", Optics Letters, vol. 18, No. 5, Mar. 1, 1993, p. 325.

Perkins, Thomas T. "Relaxation of a single DNA molecule observed by optical microscopy" Science, vol. 264, May 6, 1994.

Shingyoji, Chikako et al. "Dynein arms are oscillating force generators", Nature, vol. 393, Jun. 18, 1998.

Silverman, Michal et al. "Flagellar rotation and the mechanism of bacterial motility", Nature vol. 249, May 3, (1974).

Smith, Stephen P. et al. "Inexpensive optical tweezers for undergraduate laboratories", Am. J. Phys. 67 (1), Jan. 1999, p. 26-35.

Svoboda, Karel et al. "Direct observation of kinesin stepping by optical trapping interferometry", Nature, vol. 365, Oct. 21, 1993.

* cited by examiner

MICROFABRICATED RUBBER MICROSCOPE USING SOFT SOLID IMMERSION LENSES

CROSS-REFERENCES TO RELATED APPLICATIONS

The instant nonprovisional patent application claims priority from U.S. provisional patent Application No. 60/494,416, filed Aug. 11, 2003. This previously filed provisional patent application is hereby incorporated by reference for all purposes.

STATEMENT AS TO RIGHTS TO INVENTIONS MADE UNDER FEDERALLY SPONSORED RESEARCH OR DEVELOPMENT

This invention was made with government support under CTS-0088649 awarded by the National Science Foundation and MDA972-00-1-0019 by DARPA. The government has certain rights in the invention.

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to microscopes, and more particularly to twin lens microscopes having elastomeric lenses and methods for making the same.

The invention of the compound (twin lens) microscope by Zacharias and Hans Janssen dates from the beginning of the seventeenth century and remains the fundamental basis for modern optical microscope instruments. However, the original design suffered from low magnification and spherical aberration, defects that were not corrected until the nineteenth century when improved lens designs by Lister and Abbe came into use. Modern high performance optical microscopes still use a combination of optical elements which are made by laborious grinding techniques.

A solid immersion lens (SIL) is a lens constructed of a rubber elastomer. A SIL is difficult to form by conventional means, yet it offers the highest light collection efficiencies of any simple optic. The light collection efficiency of a lens or lens system is described by its numerical aperture (NA). In epifluorescence microscopy applications, the intensity of an observed particle varies as the fourth power of the NA—an extremely strong dependence.

Most simple lens systems have numerical apertures less than 1. However, Lister and Abbe showed that better performance can be engineered though the use of compound designs.

The simplest possible optical lenses are spherical. It is known that two cuts of a solid sphere yield aberration-free imaging. A cut through the middle of the sphere results in a hemispherical lens that enhances the numerical aperture of an optical system by n, the index of refraction of the lens material. However, a slice at a distance $R+R/n$ from the top of a sphere of radius R, results in a lens with enhanced numerical aperture at a factor of $n^2$, a significant improvement which has allowed the development of optical devices with numerical apertures greater than 1. Ball lenses, which are also termed solid immersion lenses (SILs), are known to achieve high numerical apertures for data storage applications. The high numerical aperture is used to focus beams to a small spot, thus increasing data storage density. However, these methods are hampered by the existence of an interface between the lens and the storage media, which spoils some of the numerical aperture gains.

SILs are difficult to manufacture, which heretofore has been an important limitation that has hampered their widespread adoption. Although there has been some progress with both conventional and microfabrication technology to make the lower performance hemispherical SILs, the high performance "Weierstrass"-type SIL still requires hand grinding and polishing due to its highly undercut features.

Soft lithography has been used to make a variety of fluidic, mechanical, electronic, and optical devices. An elastomeric molding process is a favored fabrication technique for a SIL, since the mold can stretch and allow the undercut features to be removed without damage to the lens or the mold.

Large SILs can be made using a simple molding process. Stainless steel ball bearings ranging in size from 0.5 mm to 2 cm can be used as positive molds. The flexible elastomer polydimethylsiloxane (PDMS) have been used both for the negative molds and for the lenses themselves. However, attempts to mold smaller lenses that would be compatible with microfabricated applications encounter fundamental problems: the surface tension of the PDMS causes it to creep on the positive mold.

What is needed is a new technique for producing microfabricated SILs so that the advantages of high numerical aperture lenses can find broader applications.

SUMMARY OF THE INVENTION

According to the invention, soft lithography with surface tension control is used to microfabricate extremely efficient solid immersion lenses (SILs) out of rubber elastomeric material for use in microscope type applications. In order to counteract the surface tension of the mold material in a negative mold that causes creep on a positive mold, material such as RTV is partially cured before use in order to allow the reticulation of polymer chains to change the viscosity of the uncured material in a controllable manner. In a specific embodiment, the techniques of soft lithography with surface tension control are used to make molded SILs out of the elastomer polydimethylsiloxane. The lenses achieve an NA in the range of 1.25. The principle of compound lens design is used to make the first compound solid immersion lens, which is corrected for higher light gathering ability and has a calculated NA=1.32. An important application of these lenses is integrated optics for microfluidic devices, specifically in a handheld rubber microscope for microfluidic flow cytometry. The invention will be better understood by reference to the following detailed description in connection with the accompanying drawings.

DETAILED DESCRIPTION OF THE INVENTION

Figure 1:
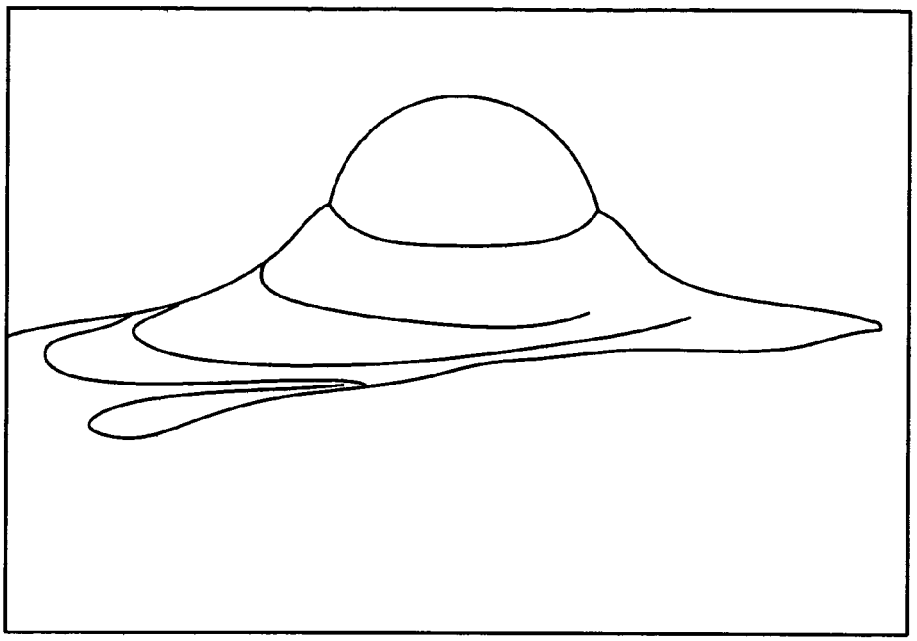
FIG. 1 is an image of a ruby bead in a mold.

Using the techniques of soft lithography as disclosed herein, small solid immersion lenses (SILs) suitable for microscopy can be made that range in size from less than 150 microns to 10 millimeters, and such SILs have been made successfully. Referring to FIG. 1, there is shown an image of a 150 micron bead in a mold according to the invention. The mold material wicks up around the bead due to surface tension. However, the height of the mold due to such creep can be accurately correlated to pre-curing of the mold material of interest, such as General Electric RTV or Sylgard PDMS, both of which can also be used as SIL material. This correlation can be used to calibrate mold depth to cooking time.

Figure 2A:
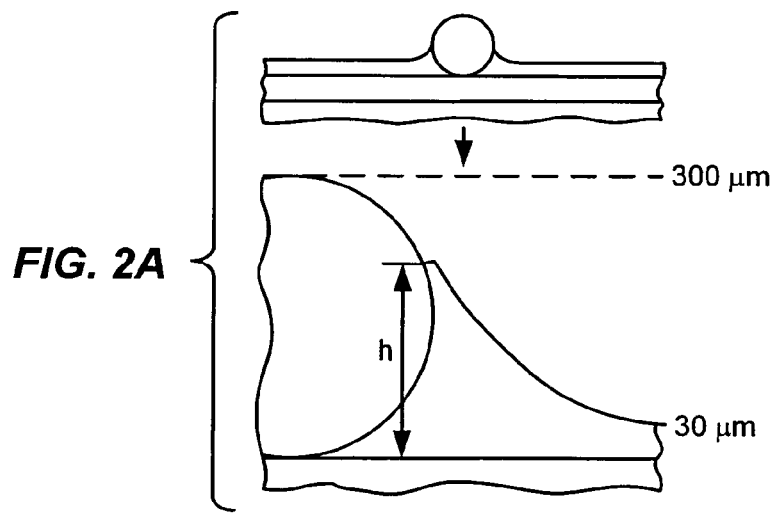
FIG. 2A is a schematic diagram illustrating how height of a mold is measured.
Figure 2B:
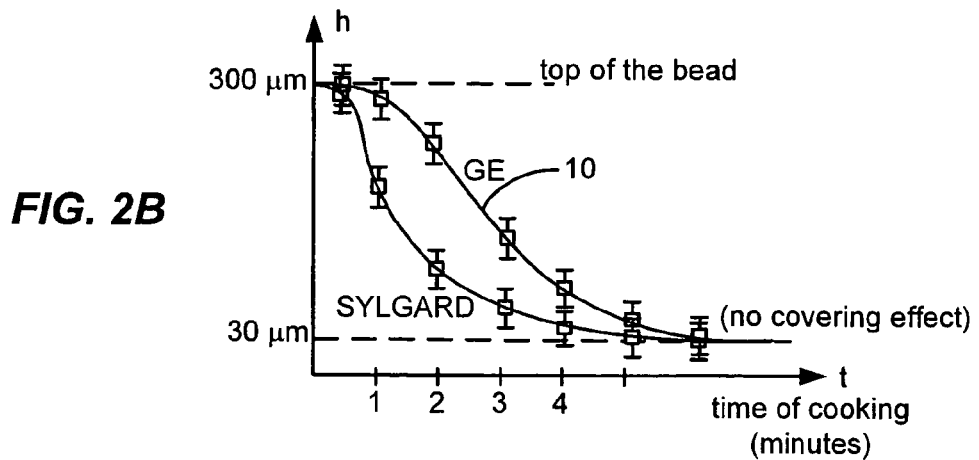
FIG. 2B is a graph illustrating height verses curing time for two types of elastomers.
Figure 3A:
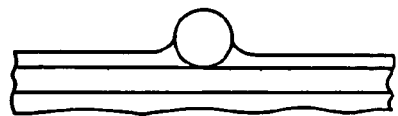
FIGS. 3A–3E are a schematic illustration of a fabrication procedure.
Figure 3B:
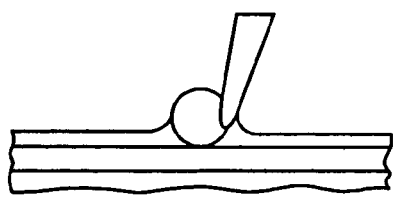
Figure 3C:
Figure 3D:
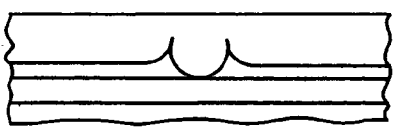
Figure 3E:
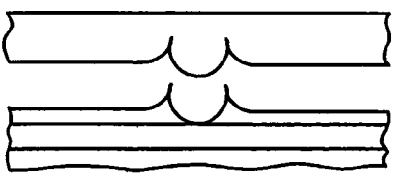

FIG. 2B is a graph illustrating the calibration of cooking time at 80° C. for two materials, the top curve 10 being for GE RTV and the bottom curve being for Sylgard PDMS. From this curve, it can be determined that for a mold depth of $h=R(1+1/n)$, in this case a 150 micron sphere, the cooking time for RTV is 2 minutes and 20 seconds and the cooking time for PDMS is less than about 1 minute.

Figure 4A:
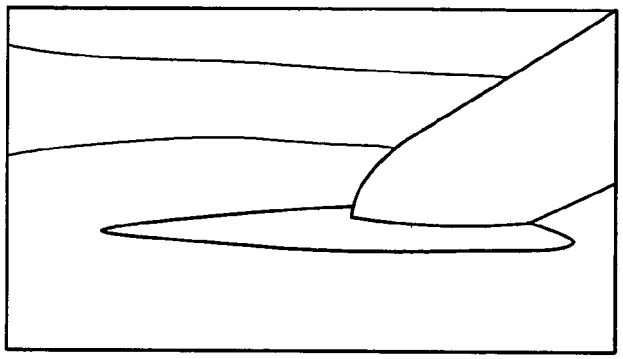
FIGS. 4A–C is 2B are a sequence of images of the manufacturing process.
Figure 4B:
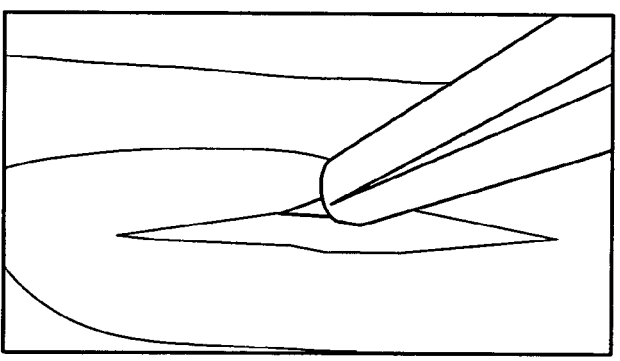
Figure 4C:
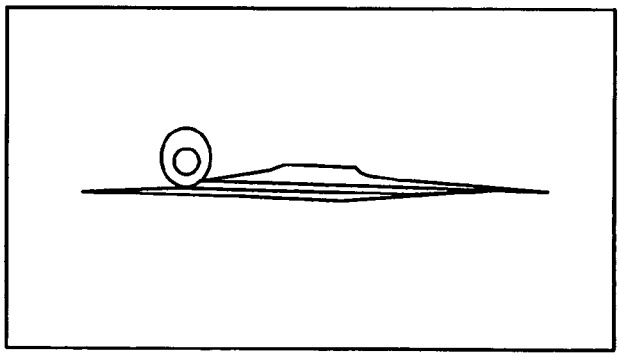

The steps of SIL formation from a positive mold bead are illustrated in FIGS. 3A through 3E. A positive mold in the form of a bead is placed on a substrate and a negative mold material is coated over the substrate and then pre-cured at 80° C. for the designated curing time (Step A). A probe is then inserted between the pliant mold and the bead (the positive mold) to remove the bead (Step B). A negative mold remains with a defined rim of the desired diameter, which can be greater or lesser than the diameter of the positive mold (Step C). Material to form the SIL is applied to cover the negative mold, and the mold is cured (Step D). The SIL is then removed from the negative mold, typically with a probe, as shown in FIGS. 4A–4C, and/or separated by lifting the layer of material forming the SIL from the negative mold, as diagrammatically illustrated in FIG. 3E (Step E). In each case of creating the mold and of removing the finished lens, the pliancy of the mold and the pliancy of the lens are important to achieve the desired shape and surface finish.

Figure 5A:
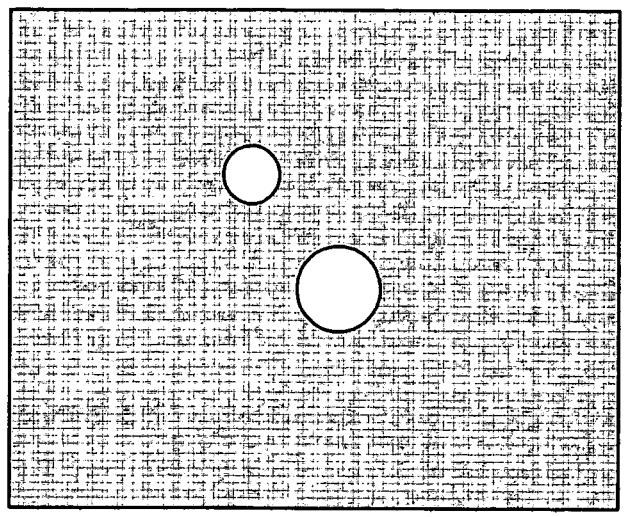
FIG. 5A is an image of a fluorescent bead taken with an SIL.
Figure 5B:
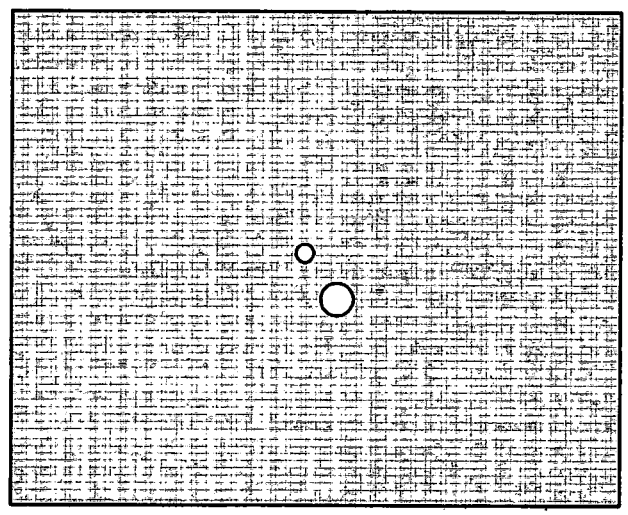
FIG. 5B is an image of a fluorescent bead taken without an SIL.
Figure 6:
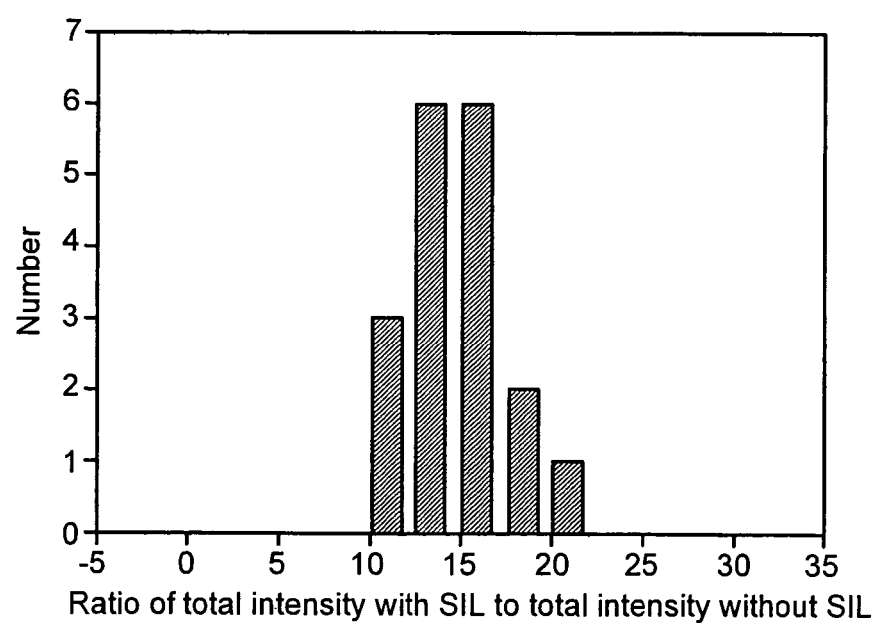
FIG. 6 is a graph illustrating that an SIL increases measured intensity.

In order to characterize the performance of the SILs, the numerical apertures of the SILs can be measured using fluorescence microscopy. According to a particular characterization, a simple microscope was constructed such that the amount of fluorescence from a latex bead could be measured with and without the SIL. Using the microscope, the bead was observed and photographed with and without the SIL. The results are illustrated by the images of FIGS. 5A and 5B. The SIL resulted in an image which increases both the size and the intensity of the spot. Varied illumination intensity demonstrated that the efficiency of the SIL does not depend on the brightness of the objects. A wide range of SIL sizes were used for these experiments, from a 2-mm radius SIL to a 395 micron radius SIL. In each case, similar results were obtained. In facts, as illustrated by the graph of FIG. 6, the typical increase in intensity of two thirds of the tested SILS was 15 times, with an intensity increase of at least ten times and as high as about 22 times.

The ratio of the total intensity collected, with and without the SIL, is related to the respective numerical apertures, with and without the SIL. The larger numerical aperture means that features formerly invisible only at lower illumination intensities now become visible.

The fundamental problem in microfabricated applications, that the surface tension of the PDMS in particular causes it to creep on the positive mold, is controlled by partially curing the RTV material before using it to allow the reticulation of polymer chains to change the viscosity of the uncured RTV in a controllable manner. By heating a thin layer of PDMS for 2 or 3 minutes at 80° C., it is possible to obtain exactly the desired depth of the mold for the SIL. The results are highly reproducible, with a precision of 20 microns.

The ratio of the total intensity collected is telated to the numerical apertures. The SIL intensity ratio is equal to numerical aperture ratio raised to the fourth power. As illustrated in FIG. 6, the average ratio of the two intensities is 15.35+/−0.53. The initial numerical aperture of the microscope without the SIL is 0.63, so the measured numerical aperture of the SIL is NA=1.25+/−0.02. This result is in good agreement with the theoretical prediction of 1.26.

Figure 7:
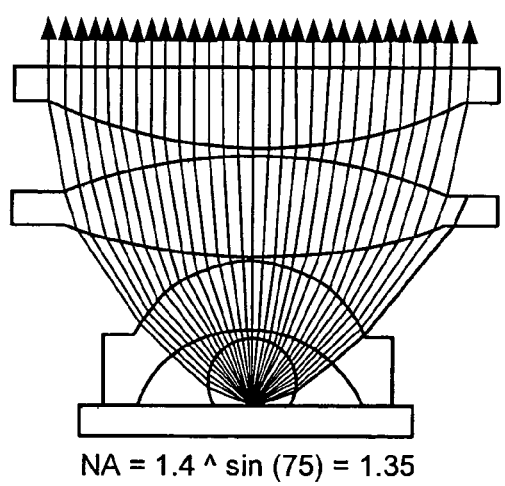
FIG. 7 is a schematic diagram of a multi-element DC-SIL.

The performance of a lens can be improved by adding several elements. (The highest performance microscope objectives have as many as 20 elements to improve light collection ability while correction for various optical aberrations.) Ray tracing suggests that one can improve the light collection ability of a SIL by creating the compound element shown in FIG. 7.

Figure 8:
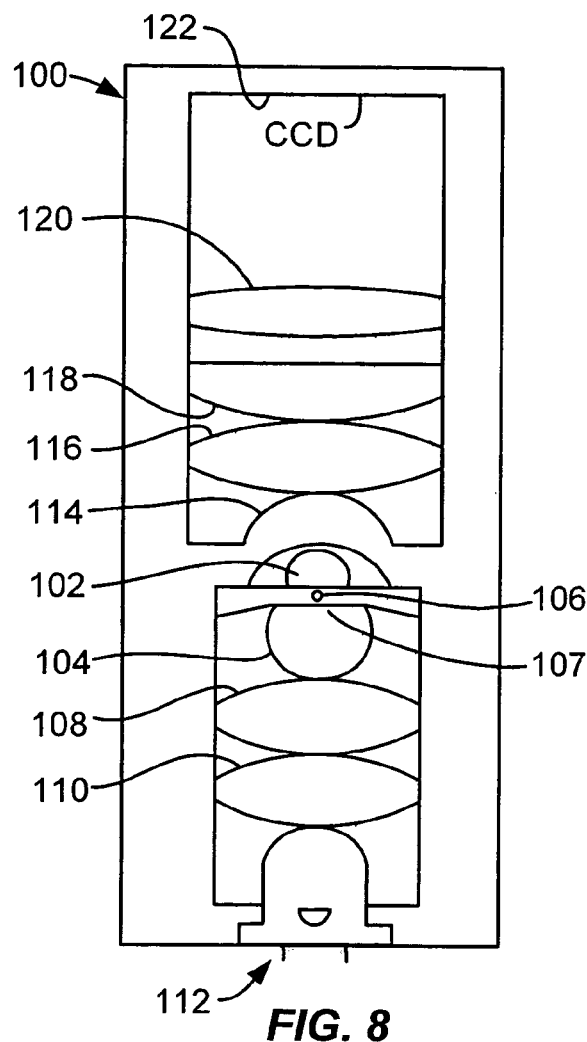
FIG. 8 is a schematic diagram of a microscope with an elastomeric SIL according to the invention.

FIG. 8 shows a microscope design according to the invention. A compound microscope of the twin lens variety uses a first SIL 102 and a second SIL 104 of larger diameter, the larger diameter SIL being the specimen viewing element. First and second SILS share a common focal point 106. There are two double convex lenses 108, 110 to serve as the front end of the lens system. On the objective side of the microscope, the concave cavity of a concave convex lens 114 encloses the first SIL 102, and a double convex lens 116 is juxtaposed to the convex surface of the lens 114. The opposite convex face is juxtaposed to the convex face of a single convex lens 118, which in turn is aligned with a double convex lens 120 of lower magnification that projects the desired image on a focal plane 122. The focal plane may carry a CCD array for recording the image of the specimen 112.

The particular design shown in FIG. 8, using two SILs of differing diameters, should improve light collection ability to an NA of 1.32, close to the index of refraction of the PDMS material forming the lenses themselves. All the lenses shown in diagram 4 are also made with PDMS using simple molding procedures.

The invention has many applications. A powerful future application for SILs is as integrated optics in microfluidic devices and DNA chip applications. These applications often use optical, usually fluorescent, read-out techniques and benefit from the use of high numerical aperture optics. In a monolithic integrated device, there are no interface problems that interfere with the ability of a SIL to collect light at its full theoretical numerical aperture.

SILs fabricated by soft lithography have the further advantage that they can be easily integrated into elastomeric microfluidic devices. Soft SILs and other elastomeric optics have been fabricated together with a microfluidic flow cytometer to make a self-contained microfluidic microscope with a calculated NA of 1.32.

Figure 9:
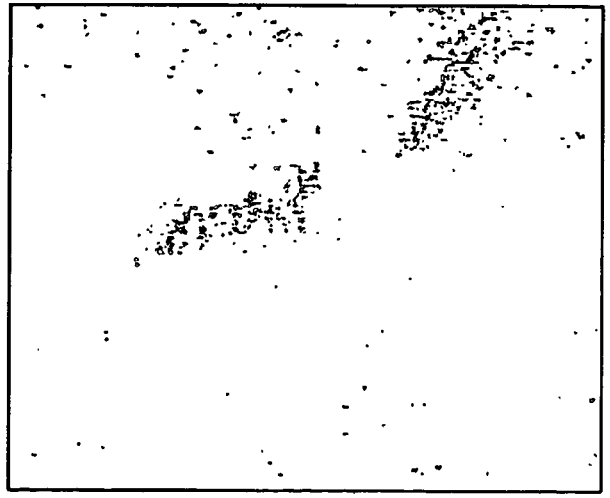
FIG. 9 is an image of a sample using a microscope according to the invention showing low light fluorescence that would otherwise be invisible but for the large effective numerical aperture.

In the microscope having eight elastomeric lenses as shown in FIG. 8; the only components not made of rubber are a dielectric filter (a slice not shown) to separate fluorescent excitation from emission and the CMOS CCD sensor on the focal plane 122 to record the image. The SIL has a radius of 150 microns and is mounted directly on the microfluidic flow cytometry chip, also made of PDMS. The total length of the microscope is about 10 cm, and the overall numerical aperture is calculated by simulation to be 1.32. This integrated optical flow cytometer was used to image individual *E. coli* cells expressing green fluorescent protein with a good signal-to-noise ratio using a lightweight and low-cost blue LED as a fluorescent excitation source. In the absence of the compound SIL lens set, the microscope is unable to detect any cells; even with increased power from the LED, no fluorescent signal can be seen. With the compound SIL lens set, the specimen cells can be easily imaged, as shown in FIG. 9. Typically, the cells are 2 microns long and 1 micron large. Bright field images show that using the SIL increases the magnification by about a factor of 2, close to the expected value of $n^2$.

In conclusion, soft lithography can be used to fabricate high performance optics. The highly undercut morphology of the SIL component makes it difficult, if not impossible, to fabricate using conventional microfabrication techniques. These optics can easily be integrated into complex devices, such as the handheld microfluidic flow cytometer. It is also possible that such optics will find use in other high performance applications such as photonics and telecommunications.

The invention has been explained with reference to specific embodiments. Other embodiments will be evident to those of ordinary skill in the art without departing from the spirit and scope of the invention. It is therefore intended that the invention not be limited, except as indicated by the appended claims.

What is claimed is:

1. A microfabricated microscope comprising:
   a first elastomeric solid immersion lens formed of a cured elastomer in a shape greater than a hemisphere and less than a sphere;
   a second elastomeric solid immersion lens formed of a cured elastomer in a shape greater than a hemisphere and less than a sphere, said second elastomeric lens being juxtaposed to said first elastomeric solid immersion lens so as to share a common focal point, thereby to yield a numerical aperture greater than 1.

2. The microscope according to claim 1 wherein the first and second elastomeric solid immersion lenses are formed by partially curing an elastomeric material forming a negative mold to a controlled semicured state with surface tension control to establish a selected mold depth and thereby a precise surface plane.

3. The microscope according to claim 1 further including a cytometer at the common focal point.

* * * * *